(12) United States Patent
Mayer et al.

(10) Patent No.: US 8,252,098 B2
(45) Date of Patent: Aug. 28, 2012

(54) NANOPARTICLE FILTER APPARATUS FOR AMBIENT AIR

(75) Inventors: Andreas Mayer, Niederrohrdorf (CH); Heinz Burtscher, Rudolfstetten (CH); Jan Czerwinski, Port (CH); Markus Kasper, Widen (CH); Richard John Artley, Zurich (CH); Günther Dobrauz, Egg B. Zuerich (CH); Gordon Edge, Essex (GB)

(73) Assignee: Matter Aerosol AG (CH)

( * ) Notice: Subject to any disclaimer, the term of this patent is extended or adjusted under 35 U.S.C. 154(b) by 676 days.

(21) Appl. No.: 12/310,155

(22) PCT Filed: Aug. 13, 2007

(86) PCT No.: PCT/CH2007/000394
§ 371 (c)(1),
(2), (4) Date: Feb. 11, 2009

(87) PCT Pub. No.: WO2008/017187
PCT Pub. Date: Feb. 14, 2008

(65) Prior Publication Data
US 2009/0314163 A1 Dec. 24, 2009

Related U.S. Application Data

(60) Provisional application No. 60/836,957, filed on Aug. 11, 2006.

(51) Int. Cl.
*B01D 53/02* (2006.01)
(52) U.S. Cl. .............. 96/111; 96/224; 96/399; 96/400
(58) Field of Classification Search .............. 96/111, 96/224, 399, 400
See application file for complete search history.

(56) References Cited

U.S. PATENT DOCUMENTS

| | | | | |
|---|---|---|---|---|
| 3,768,970 | A * | 10/1973 | Malmin | 96/224 |
| 3,772,851 | A * | 11/1973 | Duffey | 95/12 |
| 5,074,894 | A * | 12/1991 | Nelson | 96/224 |
| 5,098,767 | A | 3/1992 | Linnersten | |
| 5,430,303 | A * | 7/1995 | Matsumoto et al. | 250/492.2 |
| 5,540,761 | A | 7/1996 | Yamamoto | |
| 5,875,783 | A * | 3/1999 | Kullik | 128/204.18 |

(Continued)

FOREIGN PATENT DOCUMENTS
WO WO-91/05611 A1 5/1991

*Primary Examiner* — Robert J Hill, Jr.
*Assistant Examiner* — Christopher P Jones
(74) *Attorney, Agent, or Firm* — Lerner, David, Littenberg, Krumholz & Mentlik, LLP (57) ABSTRACT

A device for filtering nanoparticulate matter below 300 nm in size from ambient air within a defined enclosed space comprises at least one filter medium containing at least one filter material, and a fan or blower, which blows or draws the air through the filter medium does so with sufficiently low air velocity in the filter medium that the air has a long residence time in the filter medium, during which time adhesive encounters between nanoparticulate matter and the solid phase of the filter material are highly probable. This air velocity is also being sufficiently low to ensure that, once adhesion has taken place, kinetic de-adhesion by the air flow is highly improbable. Such a device allows to keep the nanoparticle count inside the enclosed space kept below 5000/cc, equivalent to 'natural woodland', even though external levels may exceeded 200,000/cc: the removal of nanoparticles by cleaning making this <2.5% the external count.

18 Claims, 10 Drawing Sheets

U.S. PATENT DOCUMENTS

| | | | |
|---|---|---|---|
| 2003/0131439 A1* | 7/2003 | Wen | 15/344 |
| 2004/0262241 A1* | 12/2004 | Socha | 210/760 |
| 2005/0175497 A1* | 8/2005 | Arai et al. | 422/3 |
| 2006/0096459 A1* | 5/2006 | Iwano et al. | 96/224 |
| 2006/0150818 A1* | 7/2006 | Okamoto et al. | 96/223 |

* cited by examiner

NANOPARTICLE FILTER APPARATUS FOR AMBIENT AIR

CROSS REFERENCE TO RELATED APPLICATIONS

The present application is a national phase entry under 35 U.S.C. § 371 of International Application No. PCT/CH2007/000394 filed Aug. 13, 2007, which claims priority from U.S. Provisional Application No. 60/836,957 filed Aug. 11, 2006, each of which are incorporated herein by reference.

TECHNICAL FIELD OF THE INVENTION

The invention relates to a nanoparticle filter apparatus for ambient air.

BACKGROUND OF THE INVENTION

Vehicles produce soot (carbonaceous and metallic) particulate matter in a wide size range of 5 to 500 nanometer and more, mostly as exhaust fumes. Most of this, 90% in terms of mass, is above 300 nanometer and is filtered partially by vehicle exhausts and car air-conditioning systems on air intake to the vehicle cabin, but not all. In particular, so called nanoparticles in the size range 5 to 300 nanometer, which comprise the majority of the soot particles, 90% by number, are not filtered effectively. Such nanoparticles can be produced e.g., in South Los Angeles alone, at a rate of 13 tonnes per day by traffic.

Such nanoparticles, especially metallic ones, are now linked to a range of diseases, such as heart attacks, cancer, lung disease, and immune system diseases, and are considered a serious health problem. They pass rapidly (systemic in under 1 hour) into body cells, and are now considered a major trigger of heart attacks and other cardiovascular diseases.

Worse, they tend to accumulate within cars, school buses, lorry cabs and buildings close to main roads, typically four times but occasionally up to and over thirty times normal levels, so that road travelers and local residents are placed daily at high risk. Groups particularly seriously affected include professional drivers (trucks, taxis, buses, trams), ordinary commuters and schoolchildren (can have 50% of daily intake in a 30 minute commute), and those living and working within 400 meters of roads.

In 2000, the California Air Resources Board (CARB) estimated that diesel particulate material was responsible for 70 percent of the state's risk of cancer from airborne toxics in California, USA. In 2004 alone, diesel pollution will cause an estimated 3,000 premature deaths in California. In addition, diesel exhaust will cause an estimated 2,700 cases of chronic bronchitis and about 4,400 hospital admissions for cardiovascular and respiratory illnesses every year. The cost of these health impacts (in California alone) is $21.5 billion per year.

Figure 1:
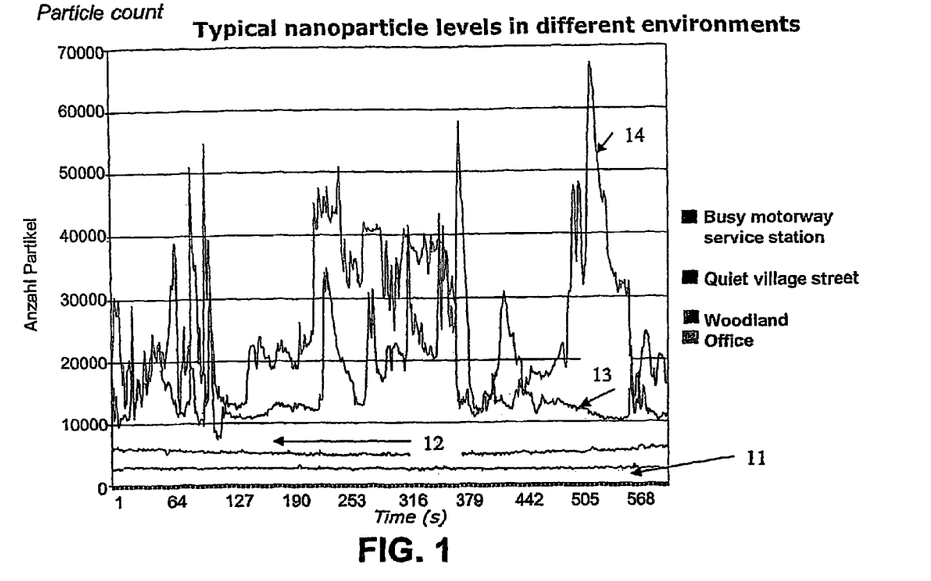
FIG. 1 A diagram showing the count of nanoparticles per cubic centimeter against time experienced inside a stationary vehicle using conventional filtering systems in various locations (curve 14 a busy motorway service station, curve 13 a quiet village street, curve 12 woodland), compared to a normal level measured inside an office (curve 11)

FIG. 1 shows ambient levels of nanoparticles encountered in different situations (for Switzerland). The 'normal' background level encountered, in an office, is curve 11, with a steady count (base, average and peak levels are all similar) of 2500 nanoparticle counts per cubic centimeter. On a road in woodland, curve 12 shows 6000 nanoparticle counts per cubic centimeter, again with base, average and peak levels all similar.

By contrast, curve 13 shows levels in a quiet village street, where the baseline count is much higher, about 12,000 nanoparticle counts per cubic centimeter, with an average around 20,000 nanoparticle counts per cubic centimeter, and peak values over 30,000 nanoparticle counts per cubic centimeter.

Curve 14 shows levels at a motorway roadside (service station) near heavy traffic with 'heavy fume'. The baseline count is about 15,000 nanoparticle counts per cubic centimeter, the average is about 30,000 nanoparticle counts per cubic centimeter (10 times 'normal'), and the peak value is almost 70,000 nanoparticle counts per cubic centimeter. It should also be noted that after a high peak, recovery to the baseline is slow and takes well over a minute.

Figure 2:
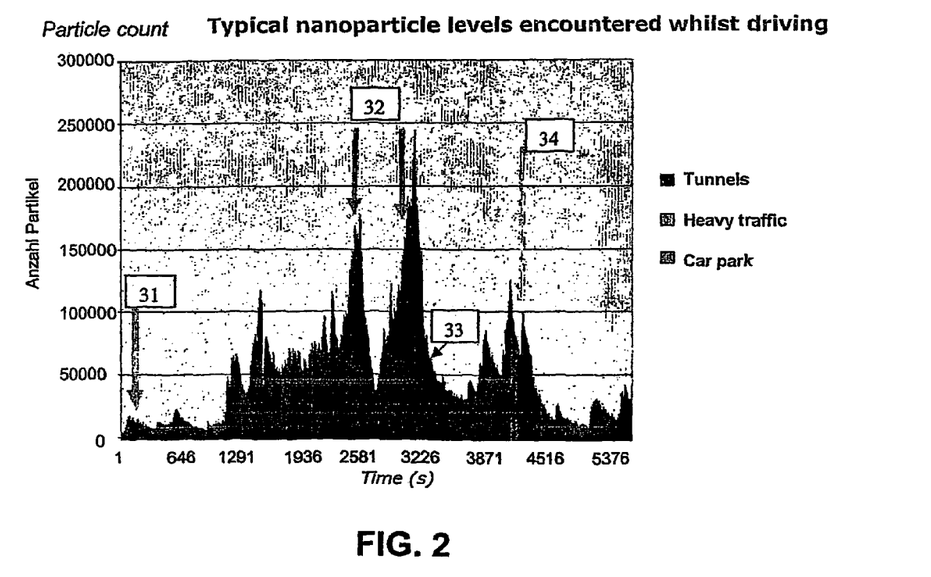
FIG. 2 A diagram showing the count of nanoparticles per cubic centimeter against time inside a moving vehicle using conventional filtering systems, where the vehicle is driving on a 90-minute circuit through various road situations including a car park (curve segment 31) tunnels (curve segments 32), exits from tunnels (curve segment 33) and heavy motorway traffic (curve segment 34).
Figure 3:
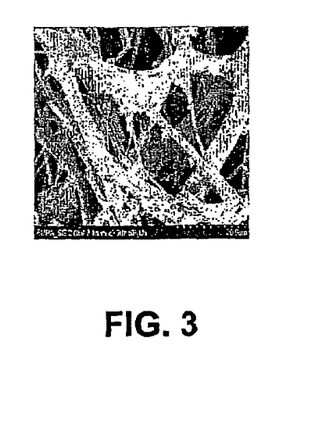
FIG. 3 A SEM image of a preferred filter material. It may be part of a pre-filter (HEPA type) e.g. of approximate area 10 cm diameter.
Figure 4:
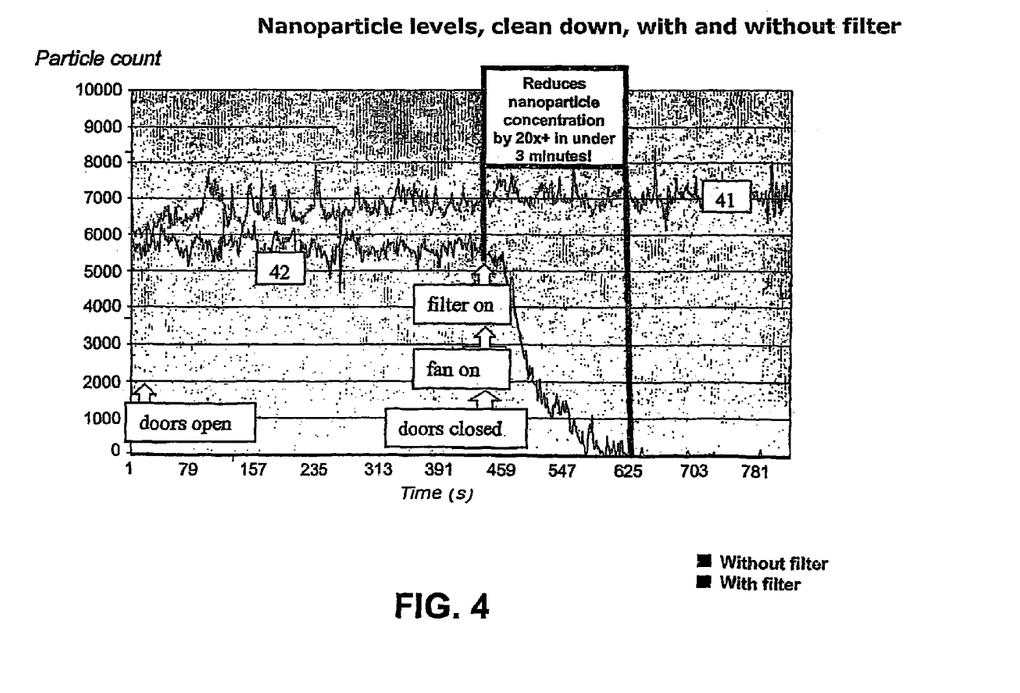
FIG. 4 A diagram showing the count of nanoparticles per cubic centimeter against time experienced outside (curve 41) and inside (curve 42) a stationary running vehicle using conventional filtering systems with the air circulation in recirculation mode, where at a certain point in time 440 seconds after the start of the test and where indicated the vehicle is closed and the new filter system is switched on to clean down the vehicle cabin air. For the first 440 seconds of the test the curve 42 inside the car shows only a small improvement over the situation outside the car, curve 41: once the car is closed and the new filter system is switched on the nanoparticle level rapidly drops.
Figure 5:
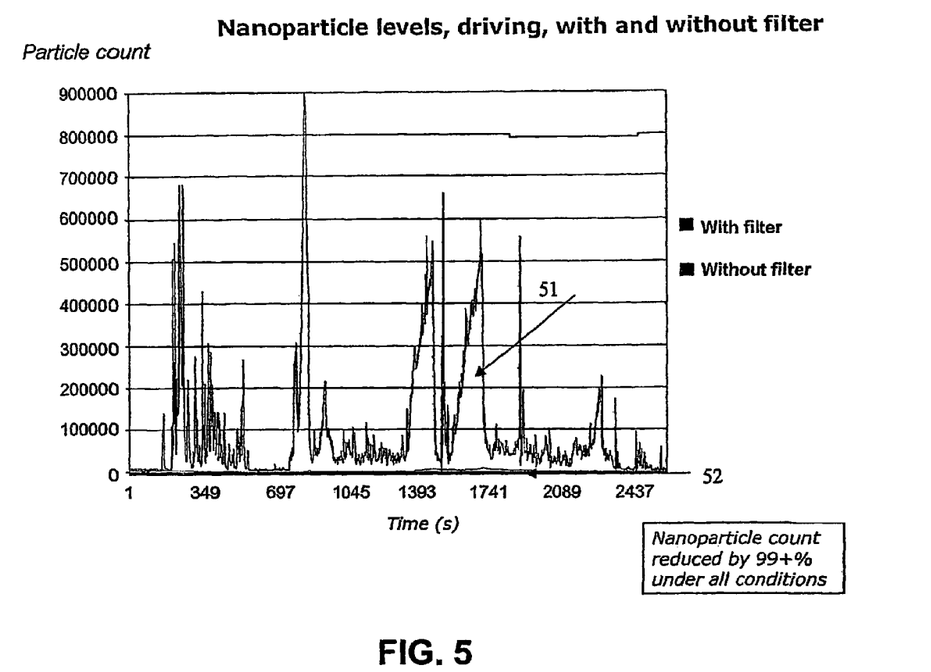
FIG. 5 A diagram showing the count of nanoparticles per cubic centimeter against time inside (curve 52) and outside (curve 51) a moving vehicle using both conventional filtering systems with the air-conditioning in recirculation mode and where the new filter system is switched on, where the vehicle is driving on a 45-minute circuit through various road situations including tunnels and heavy motorway traffic.

FIG. 2 shows similar measured values for the inside of a car (with continuous cabin air intake via the conventional filters of the air conditioning system) driving through a number of everyday situations. The measured peak values are, as expected, higher on the road than near to it, as In FIG. 1. The drive starts in a quiet quarter with little traffic (reference numeral 31) with about 10,000 nanoparticle counts per cubic centimeter. The two peaks 32 appear in the time period when the car was passing two tunnels: peak values of 175,000 and 250,000 nanoparticle counts per cubic centimeter (100 times normal). It can be seen that the relaxation curve portion 33 takes several minutes after having passed the tunnel to come down to the 'low' value of 30,000 nanoparticle counts per cubic centimeter (still 10 times normal). Reference number 34 is relate to a typical heavy motorway traffic/traffic jam situation, with peak levels, around 125,000 nanoparticle counts per cubic centimeter (50 times normal).

Measurements made simultaneously outside and inside the car, in situations where the car is completely closed, and the air conditioning on full recirculation mode via its conventional filters (so new air intake to the vehicle cabin is minimized—there is always some, both via the air conditioning system and via leaks), show that the best possible result achievable on such a drive, using such conventional measures to exclude nanoparticles, is to reduce the average nanoparticle count (for a complete journey) inside the car to about one-sixth (~17%) of the average count experienced outside the car during the same journey.

SUMMARY OF THE INVENTION

The existing filters clearly do not provide an effective filtering system since the above discussed values are readily measured values inside a modern car, even when all conventional precautions have been taken to exclude nanoparticles.

It is therefore an object of the invention to provide a new nanoparticulate filtration system.

Such a system according to the invention can especially be deployed in three ways:
- As stand-alone or portable units in vehicles and in buildings
- As retrofitted units to existing vehicle or building air-conditioning systems
- As components designed into new vehicles Such units are especially useful in school buses, private cars, trucks, taxis and other commercial vehicles, and such a system can also be used at home or in an office.

SHORT DESCRIPTION OF THE DRAWINGS

The invention will now be described in connection with the encompassed drawings. They show.

DETAILED DESCRIPTION OF THE PREFERRED EMBODIMENTS

The technology according to the invention uses a combination technologies, and will also prove effective against other particulate pollutants e.g., cigarette smoke and pollen.

A filter according to the invention also meets HEPA (high efficiency particulate air) filtration standards for larger particles: HEPA filter media are 99.97% efficient for removing particles above 0.3 microns (300 nanometers). These standards are created by the U.S. Atomic Energy Commission, and are the industry standards for particulate filtration in critical-environments.

The technology uses a small but (compared to conventional systems) extremely high back-pressure fan motor to draw air through a 'thick' pleated or other large-surface-area construction of the filter material in such a way that the nanoparticles are trapped in or on the filter material. The invention is based inter alia on three major factors—the method of filtration, filter materials selection, and blower/geometric design selection which in turn have certain consequences which also provide novelty: a further novelty arises from the way in which the filter assembly is deployed in a vehicle or other confined space.

(a) The method of filtration itself. Most conventional filtration is done using either the 'sieve' method, in which the pores are smaller then the minimum dimensions of the objects being removed from the flow stream, and so are physically impeded, or the 'impact' method, in which particles are provided with high velocity and encouraged to imbed upon impact in a 'soft' solid filter substrate material. In contrast, the present invention uses a filter medium where the pores are very much larger than the nanoparticles to be trapped, and uses a very slow velocity of air flow through the filter medium. This method of filtration is known, and is termed the 'diffusion' method. What happens is that, given sufficient time and ability to diffuse, the nanoparticles encounter the solid phase of the filter medium, and (although coatings may be used to enhance the effect) stick to the solid phase simply through van der Waals or other attractive/chemical forces—and the velocity of air flow is then insufficient to cause them (or at least the vast majority of particles captured in this way) to become subsequently de-attached. Consequently a high proportion of particles are trapped, per filter pass (fast cleaning) and yet the air flow is largely unimpeded and the filter does not become blocked. This method of filtration is not conventionally used because the need for a high residence time in the filter medium implies that the filter should be thick and the air velocity slow, and thus to clean a certain air flow volume in a certain time requires not only a large filter area but also a high back-pressure, of which conventionally used pumps or blowers are not capable.

(b) In the present invention, a very high back pressure of 1 mbar or above is preferred, as compared to conventional systems which typically use less that 1 mbar. This provides a phase velocity preferably of under 20 cm/s, and preferably under 10 cm/s, to the air stream.

(c) One consequence of the above is that the choice of high-performance nanoparticulate filter materials is not obvious to those skilled in the art of filtration, and most especially, is not necessarily a nanoporous material or indeed a conventional material already used for filtration, but may be a porous material used for other purposes, such as electromagnetic shielding.

(d) A second and more precisely stated aspect of this consequence is that, in order to maximise the trapping ability of the solid phase of the filter material, this material should not only have a high internal surface area, but should also be physically and geometrically thick (as 'sieve' systems ideally should not be), and encourage turbulent air flow within it (as 'impact' systems ideally should not be), to have the longest sensible achievable residence time of the nanoparticle-laden air inside the filter, to increase the probability of encounter with the solid phase. For a typical nanoparticle of size 100 nm under the conditions above the diffusion distance is about 40 microns per second, so thus a material with a pore size somewhat less than this, say 10 microns-100 times the nanoparticle size—still has a very good chance of trapping the nanoparticle provided the residence time in the filter is of the order of a second, in other words, that the path the particle takes through the filter is some ten centimeters long.

(e) The increase in physical thickness, and in geometric thickness (relating to the particle paths), is achieved e.g., by having highly pleated systems, such as we recommend, and in then also ensuring, preferably, that air flow through the pleated filter is not preferably through the minimum dimension, but obliquely, so that an even greater filter distance is encountered by the nanoparticles. In the system exemplified below this is achieved by having the air inside the filter moving as a slowly spinning vortex, so that the air encounters the pleated filter thickness almost tangentially.

(f) The establishment of, effectively, a very thick filter thickness in this way, naturally also has consequences for the fan blower to be used, which must not only set up flow shapes and velocities, such as the 'slow vortex' of the type we desire for the design example in FIG. 7, with a low air velocity, but which must also by physically small (desirable for use in cars and other mobile functions), and be capable of a high volume of air flow, and not least provide these air flow speed and volume characteristics against a critical back-pressure—as noted above, this is typically ten times 'that of conventional' systems—which the filter engenders. The consequence is that 'the ' fan blower must be, selected alongside the filter material and its configuration, not least to ensure that the pore size of the filter is sufficiently large to allow a good air flow and yet sufficiently small to allow a high surface area. Consequently novel combinations, such as the one illustrated in FIG. 7 using a radial compressor to establish a slow vortex, are not only possible but beneficial.

In experiments, materials of the 'nanofibrous' type, rather than 'interpenetrating-network' type materials, have proven effective, in contradiction to conventional views on filtration.

FIG. 3 shows a SEM image below shows a detail of the structure of one of these preferred materials, with nanoparticles trapped on the fibre surfaces.

Prototype units consisting of a circumferential filter, radially pleated, with a blower enclosed within the filter to provide air flow from inside to outside, and of modest dimensions, have been created as shown in FIG. 7.

The specifications of the prototypes made (as non-limiting exemplars of the invention) are:

Electronics

The electronics are those used to control the blower, and to provide power from e.g., a car cigar-lighter. The filter is passive and is not electrically connected.

Filter Media

The specifications of the prototypes made (as non-limiting exemplars of the invention) are, to trap nanoparticles 20-500 nm with a 95%+ efficiency, the exhaust velocity in the vehicle can be approx. 10 cm/s (or less)

| | Version 1 | Version 2 | Version 3 |
|---|---|---|---|
| Filter supplier | Unifil AG, CH-5702 Niederlenz | Unifil AG, CH-5702 Niederlenz | Unifil AG, CH-5702 Niederlenz |
| Material | Glasfaservlies H 10 | Glasfaservlies H 10 | |
| Outer diameter | 220 mm | 280 mm | |
| Inner diameter | 150 mm | 100 mm | |
| Height | 100 mm | 120 mm | |
| Filter area | 0.5 m2 | 2.4 m2 | |
| Air flow velocity | 10 cm/s | 10 cm/s | 10 cm/s |
| Blower distributor | Ebmpapst AG, CH-8156 Oberhasli | Anson AG, CH-8055 Zürich | ebmpapst AG, CH-8156 Oberhasli |
| Blower maker | Ebmpapst St. Georgen GmbH, D-78112 St. Georgen | Karl Klein Ventilatorenbau AG, D-73773 Aichwald | |
| Type | CPAP 939.3020.003 | DMV 250 | RG 128/1300-3612 |
| Electronic drivecontrol | VT-A 937 2400.001 | | |
| Nominal power | 32 W | 120 W | 61 W |
| Volume lift | 30 m3/hour | 180 m3/hour | 132 m3/hour |
| Back pressure | 50 mbar | 10 mbar | 17 mbar |
| Nominal voltage | 24 V DC | 400 V (converter from 24 V DC) | 24 V DC |

The required back-pressures are those set by the blowers, but should be preferably at least 10 mPa and if possible 20 mPa or more. The preferred nanoparticle filter medium is thus the nanofibrous one noted above and of which FIG. 3 shows an SEM.

These apparently simple, yet sophisticated and novel designs, gives rise to an unexpectedly effective reduction in the nanoparticle count within enclosed volumes (e.g., a car interior) even with these modest sized systems.

Clean-Down Tests.

Full-scale prototypes test the nanoparticle filters under a variety of actual route conditions, including 'high-exposure' urban and tunnel situations, in a test-car with the air conditioning turned on, in recirculation mode (so that there is some, but limited, external air entering the vehicle cabin).

FIG. 4 shows the results when the stationary car is closed (the air conditioning being in recirculation mode), and the filter system is switched on. From a background level of around 6000 nanoparticle counts per cubic centimeter, a significant and extremely rapid nanoparticle reduction to below 300 nanoparticle counts per cubic centimeter (over 95%) within 3 minutes is obtained.

Constant-Running Tests

FIG. 5 shows that, once cleaned down, the new filter system (with the air conditioning still turned on, in recirculation mode, so that there is still some, but limited, external air entering the vehicle cabin), can maintain a level of nanoparticles in the moving car, during driving on the test circuits, below 3000 nanoparticle counts per centimeter. This occurs even when the external nanoparticle count peaks are 900,000 nanoparticles per cubic centimeter, and/or there are sustained (for over 1 minute) external nanoparticle counts of over 300,000 nanoparticle counts per cubic centimeter—i.e., the sustained internal level is being maintained at less than 1% of the sustained external level.

Figure 6:
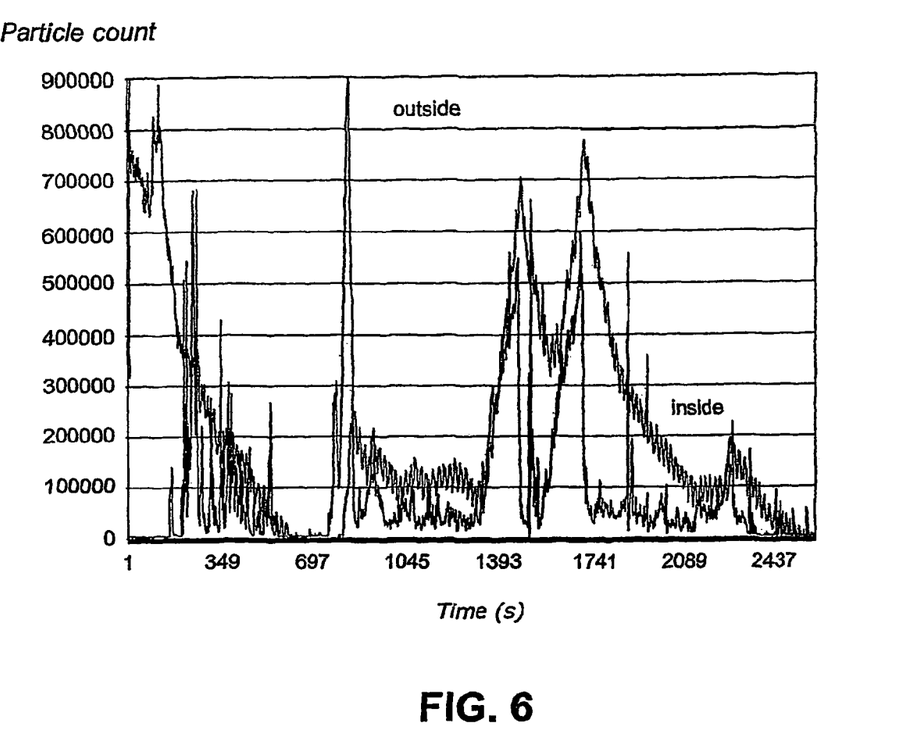
FIG. 6 This is a version of FIG. 5 where curve 52 has been rescaled to 100× its actual level to allow better comparison with curve 51. It can be seen that the reduction in overall average nanoparticle exposure is better than 99%.

As FIG. 6 shows, importantly, use of the new filter system brings down the nanoparticle count inside the car in all aspects of baseline, average and peaks, down to the equivalent of the situation inside a closed office. The system is thus effective both in lowering particle count, and keeping it low, whether measured as baseline, average, or peak exposures.

Again please note that the reaction time of the system (versus the several-minute reaction time of the conventional air conditioning system alone, noted above) is much faster a high peak incident can be cleaned down in seconds.

The above measurements were all taken in situations where the air condition of the car is in recirculation mode (which can also be used as conventionally for heating/cooling) and new air from outside, amounting to 5-10% of the volume passing through the conventional air conditioning system, is added through our new filter.

This is a particularly promising mode of operation, since the air is cleaned before it reaches the vehicle cabin, and the average nanoparticle count (for a complete journey) inside the car can be reduced to about 2% of the average count experienced outside the car during the same journey. If new air is allowed to enter not via the new filter but via the conventional air-conditioning system (and leaks) then the filter, attempting to clean the dirty air in the cabin, can only maintain an average nanoparticle count (for a complete journey) inside the car of about 7% of the average count experienced outside the car during the same journey, which although better than the 17% achieved by the conventional air-conditioning alone, is still not ideal. (The new filter can maintain an average internal nanoparticle level of 75% of the external level if the conventional air-conditioning is switched to intake mode, being limited by the relative sizes of the air flows possible: this is thus only recommended if the external nanoparticle count is already low).

Figure 7:
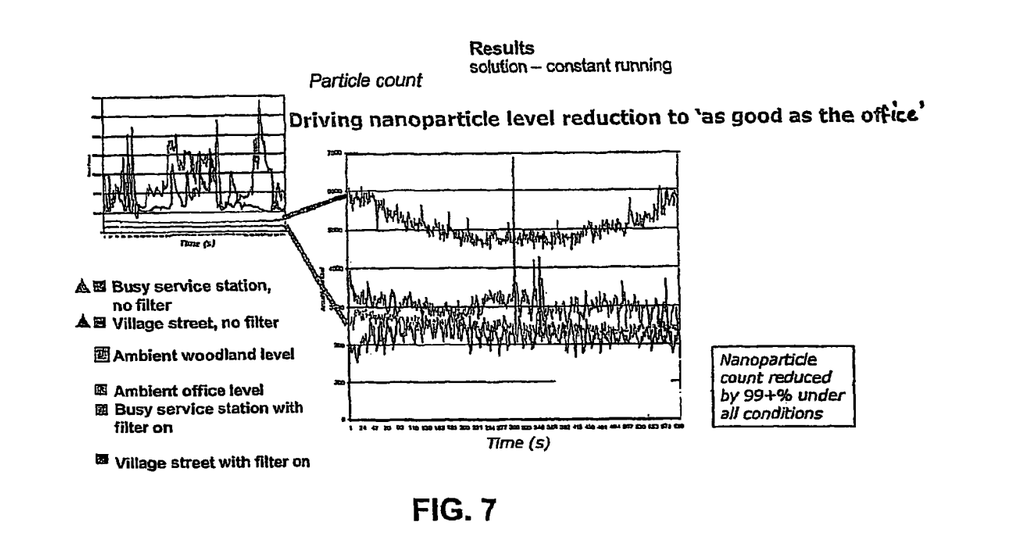
FIG. 7 A diagram showing the count of nanoparticles per cubic centimeter against time experienced inside a stationary vehicle using conventional filtering systems with the air-conditioning in recirculation mode and where the new filter system is switched on, in various locations, compared to a normal level measured inside an office and a normal level measured outdoors in woodland.

This mode, where the new air entering the cabin does so only via our new filter, looks promising, even with relatively low flow rates, and in itself represents a novel mode of operation. The 'new' air coming into the cabin sent through the nanoparticulate filter creates a slight overpressure inside the car (rather than vice-versa, as is usually encountered) so that the cabin is under positive pressure and thus tends to keep 'dirty' air from leaking in. The new filter in this format has to be modified with an additional element to capture the large soot particles, as these are now not taken out beforehand by the conventional air-conditioning system, but this is readily achievable, and indeed one adventitious benefit of the 'vortex' system as described above and in FIG. 7 is that the large particles can be segregated within the vortex and separately trapped, thus not leading to clogging of the nanoparticle filter itself.

Figure 8:
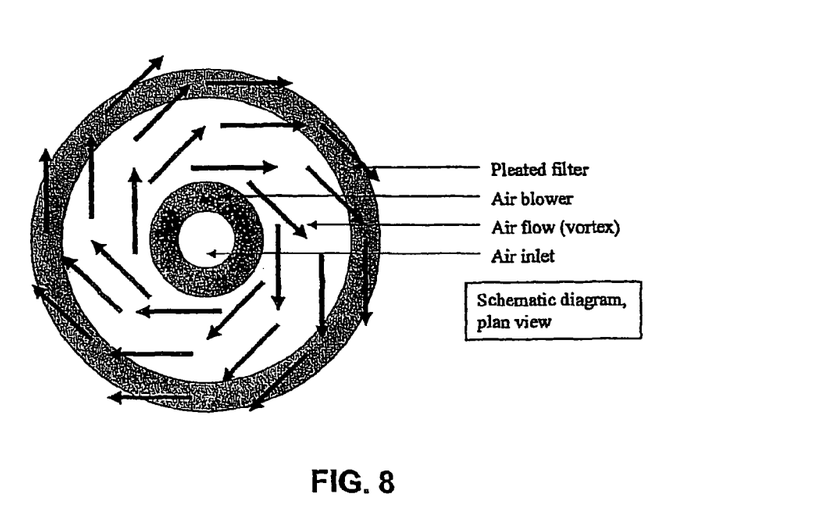
FIG. 8 A schematic diagram of the filter system
Figure 9:
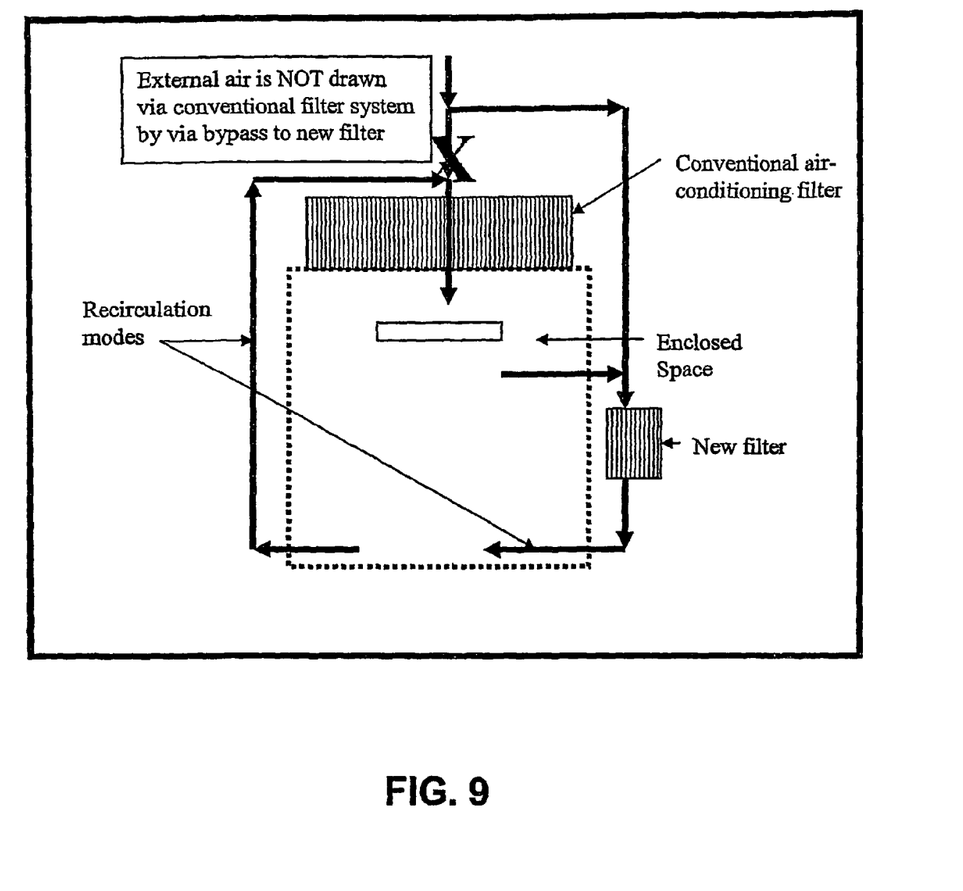
FIG. 9 A schematic diagram of the filter system as used to create clean air intake and overpressure within a defined space FIG. 10 A schematic representations of different embodiments of the filter system having a cylindrical intake and output surfaces as visualized by arrows FIG. 11 A schematic cross-section of and view from above on a further embodiment FIG. 12 A schematic cross-section of and view from above on a further embodiment FIG. 13 A schematic cross-section of and view from above on a further embodiment FIG. 14 A schematic cross-section of and view from above on a further embodiment FIG. 15 A schematic cross-section of a further embodiment of the filter system FIG. 16 A further diagram showing the count of nanoparticles per cubic centimeter against time inside and outside a coach
Figure 10:
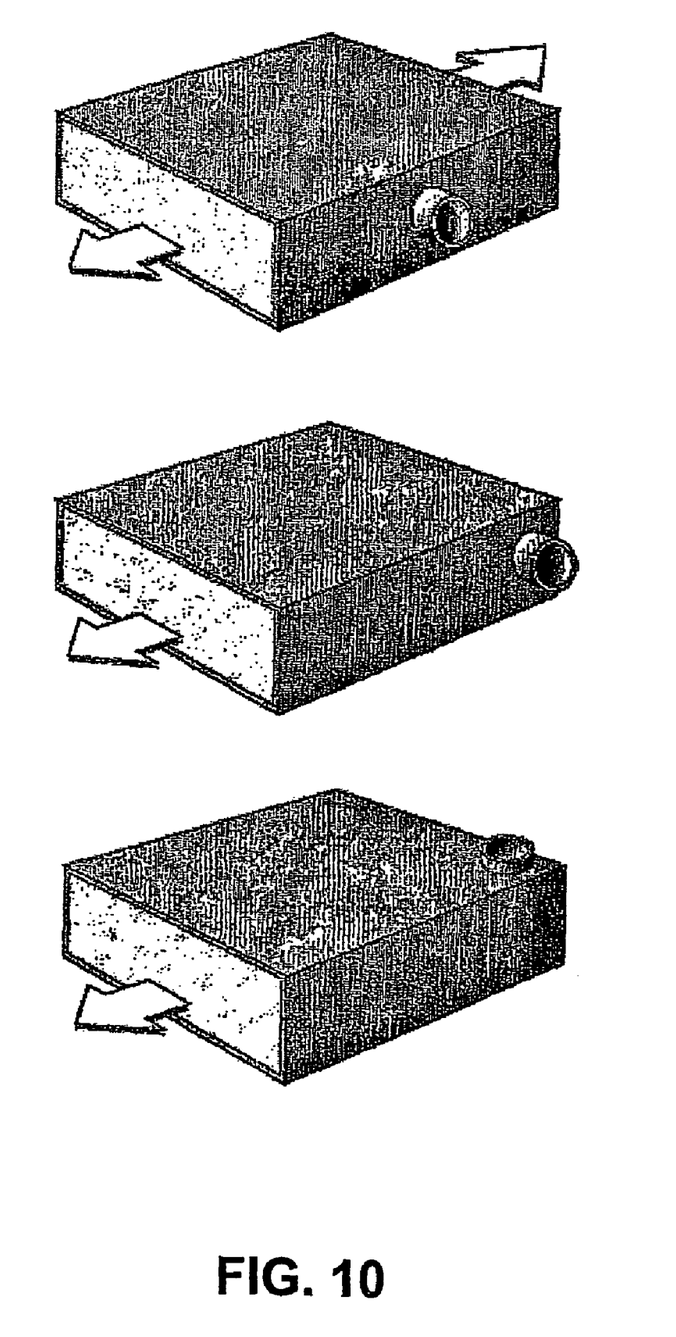
Figure 11:
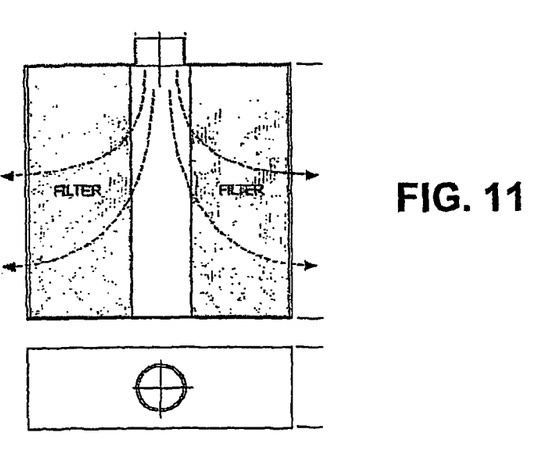
Figure 12:
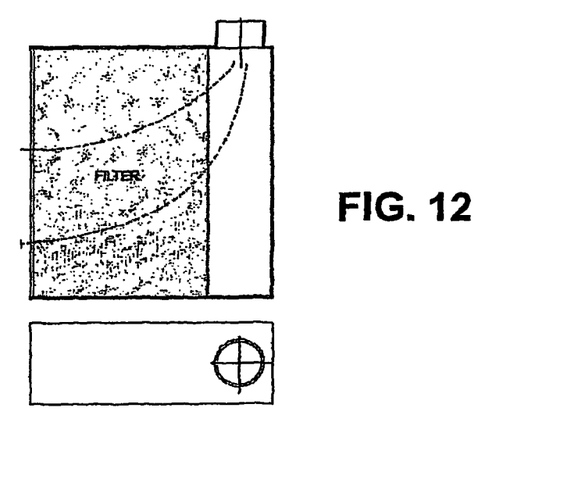
Figure 13:
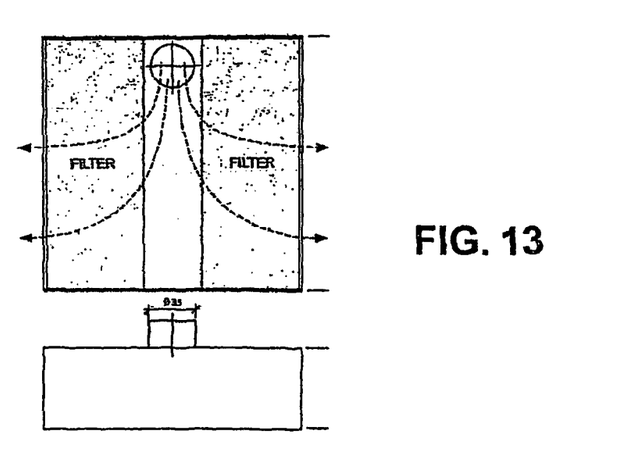
Figure 14:
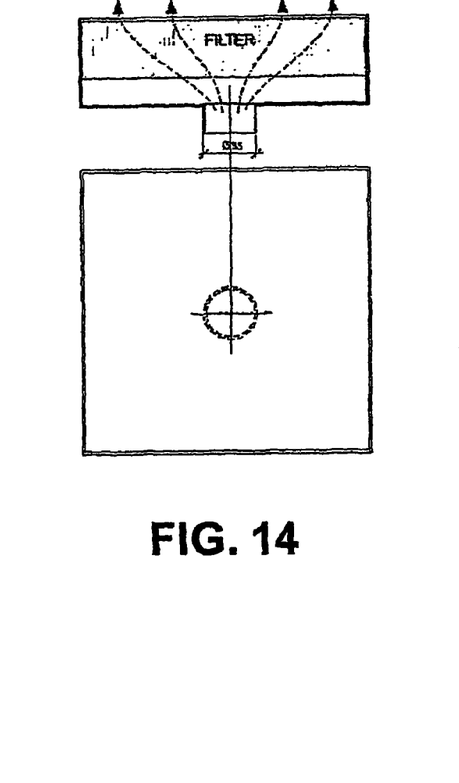
Figure 15:
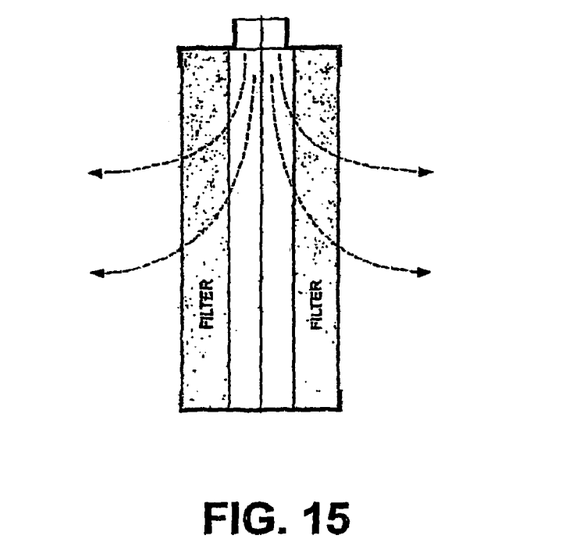

FIG. 8 shows schematic details of how such a system could be arranged.

To the above basic design various refinements can readily be added, such as:
Heating (by e.g., IR lamps) to 'dry down' the filter and act against humidity and microbes
Use with an activated carbon element to absorb bad smells
Irradiation, e.g., by UV lamps, to kill trapped viruses
Using a surface layer or coating with 10-20 micron sized-pores as part of the filter medium to trap microbes
Triggering and/or control of the action of the nanoparticle filter using a 'dirty air' sensor The term highly probably (respectively, highly improbable) is defined as a percentage of more than 60% (less than 40%), preferably more than 80% (less than 20%), even more preferred more than 95% (less than 5%) and ideally more than 99% (less than 1%) of nanoparticles-attach and do not de-attach from the filter material.

FIG. 10 and FIGS. 11 to 15 show schematic representations of different embodiments of the filter system. The embodiments show, that it is possible to use such devices in geometrically confined spaces.

Figure 16:
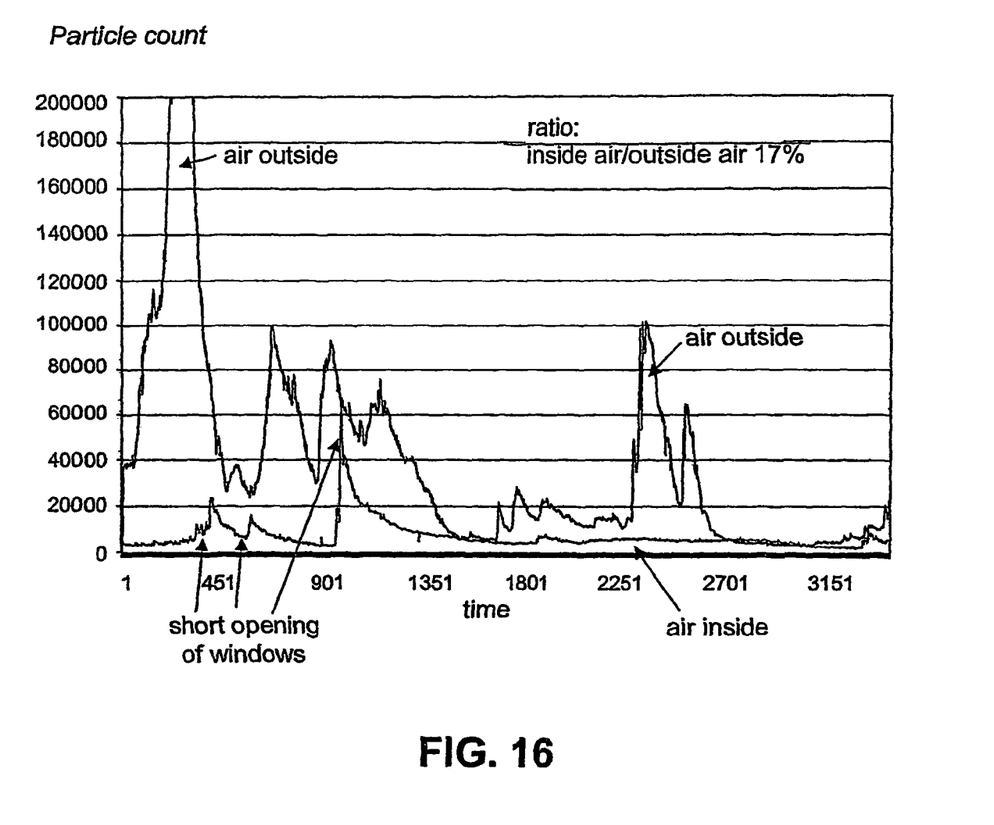

FIG. 16 shows a further diagram showing the count of nanoparticles per cubic centimeter against time inside and outside a coach. The test had been, carried out in a fully occupied 35-seater coach travelling from Rheintal to Davos. The coach was fitted with three systems each capable of 180 m3/hour airflow, fitted to replace the coach's air conditioning intake systems, taking air from the luggage compartments, filtering it, and delivering it to the passenger compartment whilst the normal air-conditioning system was in recirculation mode. Since this provides limited interchange of air, rising $CO_2$ levels inside might have been expected: however no problems were encountered with $CO_2$ levels. External and internal nanoparticle levels for the ~1 hour journey to Davos are shown (external=darker and higher, internal=lighter and lower): there was a range of traffic conditions, including a crowded car-park at the start of the journey. On the journey to Davos the windows were opened three times as indicated, and the nanoparticle count inside the bus rapidly became close to that outside: on closing the windows, the count gradually decreased again. Except when the windows were open, the nanoparticle count inside was kept below 5000/cc, equivalent to 'natural woodland', even though external levels exceeded 200,000/cc: the removal of nanoparticles by cleaning making this <2.5% the external count.

The above description is considered showing not limiting embodiments. The scope of protection is solely defined by the attached claims.

The invention claimed is:
1. A filter system to create clean air intake within a defined enclosed space comprising:
a defined enclosed space;
an air conditioning filter which conditions the air within the enclosed space;
a device for filtering nanoparticulate matter below 300 nm in size from ambient air within the defined enclosed space, said filtering device comprising:
a recirculation path exiting said enclosed space and entering said enclosed space via said device for filtering nanoparticulate matter; and
a bypass leading into said enclosed space via said device for filtering nanoparticulate matter;
wherein said device for filtering nanoparticulate matter comprises
at least one filter medium containing at least one filter material having a solid phase, and
a fan or blower which blows or draws the air through the filter medium with sufficiently low air velocity in the filter medium such that the air has a long residence time in the filter medium, wherein adhesive encounters between nanoparticulate matter and the solid phase of the filter material are highly probable, this air velocity also being sufficiently low to ensure that, once adhesion has taken place, kinetic de-adhesion by the air flow is highly improbable and wherein the device for filtering nanoparticulate matter is configured such that most and/or all the air intake to the defined enclosed space occurs via the device.

2. The filter system according to claim 1, wherein the device for filtering nanoparticulate matter is arranged such to clean air also within the defined enclosed space.

3. The filter system according to claim 1, wherein the device for filtering nanoparticulate matter is arranged such that air entering in the enclosed defined space must have at least one pass through the device before it enters the defined space.

4. The filter system according to claim 1, wherein the device for filtering nanoparticulate matter is further configured that it creates an overpressure within the defined enclosed space thus preventing or hindering air ingress not via the device for filtering nanoparticulate matter.

5. The filter system according to claim 1, wherein the fan or blower used has sufficient capacity, including but not limited to air velocity, air volume, air back-pressure and air flow characteristics that when used in combination with a suitably selected filter medium, that air is drawn through in sufficiently significant quantities to permit rapid cleaning of the air of nanoparticulate matter within a defined enclosed space or a defined space for which air intakes are generally known, the back-pressure of such a system being preferably greater than 10 mbar.

6. The filter system according to claim 1, wherein the fan or blower used in combination with a suitable nanoparticulate filter medium is a radial compressor.

7. The filter system according to claim 1, wherein the filter materials comprising the filter medium are selected from the group consisting of nanofibrilous or nanofibrous materials, that is, having high internal surface areas and also relatively large pore diameters, so that the average pore diameters are 10× the average fibril or fibre diameters, and the pore diameters are in the range of tens of microns.

8. The filter system according to claim 1, wherein the fan or blower used in combination with a suitable nanoparticulate filter medium is installed inside an enclosure whose air egress lies via the filter medium, where air flows such as but not limited to vortices and turbulence may be set up to control the air velocity inside the filter medium and to optimize the time spent by the air inside the medium at or below the critical air velocity, and where also the air flows permit the separation and thus the separate capture in a device element not the nanoparticulate filter medium of particulate matter above 300 nm.

9. The filter system according to claim 1, wherein the device comprises an air intake facing downstream.

10. The filter system according to claim 1, wherein the device comprises an air intake facing otherwise partially screened from expected sources of particulate matter.

11. The filter system according to claim 1, wherein the device comprises an air intake comprising device-internal or device-external elements that are also configured to prevent intake of and/or filter out particulate matter above 300 nm.

12. The filter system according to claim 1, wherein the operation of the device, both on/off and degree of power of operation within its operational limits, is controlled in whole or in part by sensor systems which measure at least nanoparticle concentration in ambient air within an defined enclosed space or a defined space for which air intakes are generally known, and which may additionally measure at least nanoparticle concentration in the ambient air outside the defined space.

13. The filter system according to claim 1, wherein the device is sufficiently compact to be installed on or in a movable object such as but not limited to a vehicle, such as but not limited to cars, buses, trucks, taxis, boats, lorries, and other private and/or commercial vehicles.

14. The filter system according to claim 1, wherein the device is the part or whole of a stand-alone system which can be relocated and used at will or in that the device is installed on or in a normally stationary object such as but not limited to a building or part thereof.

15. The filter system according to claim 1, wherein the device further contains a source of heating such as but not limited to sources of infra-red light, which is capable of drying the medium and also killing certain micro-organisms, trapped as part of the nanoparticulate matter on and/or in the nanoporous filter medium.

16. The filter system according to claim 1, wherein the device further contains an activated carbon element to absorb or adsorb unpleasant odiferous chemicals.

17. The filter system according to claim 1, wherein the device further contains a source of UV light, which is capable of killing micro-organisms such as but not limited to fungi and viruses, trapped as part of the nanoparticulate matter on and/or in the nanoporous filter medium.

18. The filter system according to claim 1, wherein the device further contains as part of the filter medium a filter material or an adaption of a filter material such as but not limited to a coating, which either through surface adhesion conditions and/or through controlled pore size is capable of trapping micro-organisms such as but not limited to fungi and bacteria.

* * * * *

UNITED STATES PATENT AND TRADEMARK OFFICE
CERTIFICATE OF CORRECTION

PATENT NO. : 8,252,098 B2  Page 1 of 1
APPLICATION NO. : 12/310155
DATED : August 28, 2012
INVENTOR(S) : Andreas Mayer et al.

It is certified that error appears in the above-identified patent and that said Letters Patent is hereby corrected as shown below:

On the Title Page

Column 1, Inventors, "Egg B. Zuerich" should read -- Zollikon --.

In the Specification

Column 5, line 54, "'the'" should read -- the --.
Column 8, line 15, delete "," after "been".

Signed and Sealed this
First Day of September, 2015

Michelle K. Lee
*Director of the United States Patent and Trademark Office*